(12) United States Patent
Donnelli

(10) Patent No.: US 8,160,766 B2
(45) Date of Patent: Apr. 17, 2012

(54) SYSTEM AND METHOD FOR DETECTING LOW TIRE PRESSURE ON A MACHINE

(75) Inventor: Aaron M. Donnelli, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 668 days.

(21) Appl. No.: 12/292,790

(22) Filed: Nov. 26, 2008

(65) Prior Publication Data

US 2010/0131147 A1  May 27, 2010

(51) Int. Cl.
*G01M 17/00* (2006.01)
*G06F 7/00* (2006.01)
*B60C 23/00* (2006.01)

(52) U.S. Cl. .......................................... 701/29; 340/443

(58) Field of Classification Search .................. 701/124; 73/65.01, 65.06, 65.09
See application file for complete search history.

(56) References Cited

U.S. PATENT DOCUMENTS

| | | | |
|---|---|---|---|
| 4,529,961 A | 7/1985 | Nishimura et al. | |
| 5,604,307 A | 2/1997 | Iida et al. | |
| 5,736,939 A | 4/1998 | Corcoran | |
| 6,338,012 B2 | 1/2002 | Brown et al. | |
| 6,571,481 B1 * | 6/2003 | Weiss | 33/203 |
| 6,842,680 B2 | 1/2005 | Doddek et al. | |
| 6,993,449 B2 | 1/2006 | Koebe et al. | |
| 7,089,099 B2 | 8/2006 | Shostak et al. | |
| 7,289,876 B2 * | 10/2007 | Lussen et al. | 700/213 |
| 7,305,288 B2 | 12/2007 | Yanase | |
| 7,688,184 B2 * | 3/2010 | Shimomura et al. | 340/426.33 |
| 2002/0056582 A1 | 5/2002 | Chubb et al. | |
| 2004/0041358 A1 | 3/2004 | Hrovat et al. | |
| 2004/0111198 A1 | 6/2004 | Kin et al. | |
| 2006/0244581 A1 | 11/2006 | Breed et al. | |
| 2006/0267750 A1 * | 11/2006 | Lu et al. | 340/440 |
| 2007/0034000 A1 | 2/2007 | Nakao | |
| 2007/0057478 A1 | 3/2007 | Shoyama et al. | |
| 2007/0170667 A1 | 7/2007 | Xu et al. | |
| 2008/0009986 A1 | 1/2008 | Lu et al. | |
| 2008/0065290 A1 | 3/2008 | Breed et al. | |
| 2008/0147277 A1 * | 6/2008 | Lu et al. | 701/45 |
| 2009/0099735 A1 * | 4/2009 | McCoy et al. | 701/46 |
| 2011/0098882 A1 * | 4/2011 | Sugisawa et al. | 701/35 |

FOREIGN PATENT DOCUMENTS
KR   1020000008204   2/2000
* cited by examiner

*Primary Examiner* — James Trammell
*Assistant Examiner* — Michael D Lang
(74) *Attorney, Agent, or Firm* — Finnegan, Henderson, Farabow, Garrett & Dunner LLP

(57) ABSTRACT

A method of detecting a low tire pressure condition on a machine is disclosed. The method may include determining at least one of an actual pitch of the machine and an actual roll of the machine, at a known location and determining at least one of an expected pitch of the machine at the known location and an expected roll of the machine at the known location. The method may further include comparing at least one of the actual pitch to the expected pitch of the machine and the actual roll to the expected roll of the machine. The method may also include outputting a signal indicative of the low tire pressure condition of at least one tire, if at least one of the actual pitch and the actual roll deviate from the expected pitch and the expected roll of the machine, respectively.

20 Claims, 3 Drawing Sheets

SYSTEM AND METHOD FOR DETECTING LOW TIRE PRESSURE ON A MACHINE

TECHNICAL FIELD

The present disclosure relates generally to tire pressure monitoring systems and, more particularly, to a system and method for detecting a low tire pressure condition on a machine.

BACKGROUND

In many work environments, particularly those that involve the operation of wheeled machines to transport goods or materials from one location to another, detecting a tire health issue on the machines is part of improving the efficiency and productivity of the work environment. Tire health issues include loss of pressure in one or more tires, and/or failure of one or more tires. For example, detecting and then remedying a tire health issue associated with a machine reduces the amount of energy that is used to move the machine and, therefore, increases the fuel efficiency of the machine. Also, detecting a tire health issue associated with a machine may allow the tire health issue to be addressed before a blowout or failure of a tire, reducing time lost to maintenance, reducing the number of tires requiring replacement, and increasing tire life of the machine. Furthermore, detecting and remedying a tire health issue may reduce stress and strain forces on machine drive train components, which may prolong drive train lifespan and reduce costs associated with premature component failure. When the tires of a machine are in a balanced condition, these components operate best and with the least amount of wear. This issue can be exacerbated when the machine is remotely or autonomously controlled.

Some factors that affect tire health include physical features of the machine or its constituent components, the surface of the road or path upon which the machine is traveling, and/or characteristics of the machine/road interface. For example, tire health may depend on physical features of the machine such as the machine weight (including payload), the machine speed, and tire pressure and size; physical features of the haul road or other surface, such as road surface density, coefficient of friction, road grade; and/or characteristics of the machine/road interface such as slippage of the machine tires on the roadway surface. Thus, in an effort to improve the health, longevity, and/or efficiency of one or more tires and to increase the efficiency of the machine, a method for detecting a low tire pressure condition and alerting the operator of the machine of low tire pressure conditions may be required.

One way to determine tire health is disclosed in U.S. Patent Application Publication No. 2006/0267750 (the '750 publication) published on Nov. 30, 2006 to Lu et al. The '750 publication describes a system and method for controlling an automotive vehicle. The system uses various tire parameters such as a rolling radius, a vertical spring rate, and a tire rotational spring rate to determine an abnormal state of the tire. The '750 publication controls the vehicle in response to the detected abnormality. To control the vehicle, the '750 publication uses various sensors existing in the vehicle, such as a yaw signal, roll signal, and pitch signal, to determine a tire parameter. The '750 publication then uses the tire parameter, and various dynamic control systems such as antilock brakes and traction control, to control the vehicle.

Although the system of the '750 publication may determine a tire health, it may be complex and have a significant number of sensors that may increase costs. For example, the '750 publication requires the calculation and comparison of several tire parameters, such as a rolling radius, a vertical spring rate, and a tire rotational spring rate to determine a tire abnormal state. The '750 publication may use extra sensors, and perform extra calculations to determine a tire abnormal state. If conditions, such as vehicle loading, road conditions, and wind forces, have to be accounted for, they may require complex calculations and additional sensors.

The disclosed embodiments are directed to improvements in the existing technology.

SUMMARY

In one aspect, the present disclosure is directed to a method of detecting a low tire pressure condition on a machine. The method may include determining at least one of an actual pitch of the machine and an actual roll of the machine, at a known location, and determining at least one of an expected pitch of the machine and an expected roll of the machine, at the known location. The method may further include comparing at least one of the actual pitch to the expected pitch of the machine and the actual roll to the expected roll of the machine. The method may also include outputting a signal indicative of the low tire pressure condition of at least one tire, if at least one of the actual pitch and the actual roll deviate from the expected pitch and the expected roll of the machine, respectively.

In another respect, the present disclosure is directed to a system for detecting a low tire pressure condition on a machine. The system may include a sensor for measuring an actual pitch and an actual roll of the machine. The system may also include a position location system communicatively coupled to the sensor and configured to record a location of the machine corresponding to a location wherein the actual pitch and actual roll of the machine were measured. The system may further include a controller communicatively coupled to the sensor and the position location system, the controller configured to receive information indicative of the actual pitch and the actual roll of the machine from the sensor. The controller may be additionally configured to receive information indicative of the location of the machine from the position location system. The controller may be further configured to determine whether at least one of the actual pitch and the actual roll deviate from an expected pitch and an expected roll of the machine, respectively, at the location of the machine corresponding to where the actual pitch and the actual roll of the machine were measured. The controller may be additionally configured to output a signal indicative of the low tire pressure condition of at least one tire if at least one of the actual pitch and the actual roll deviate from the expected pitch and the expected roll of the machine, respectively, at the location of the machine corresponding to where the actual pitch and the actual roll of the machine were measured.

In accordance with yet another aspect, the present disclosure is directed toward a computer-readable medium for use on a computer system, the computer-readable medium including computer-executable instructions for performing a method, when executed by a processor, for detecting a low tire pressure condition on a machine. The method may comprise determining at least one of an actual pitch of the machine and an actual roll of the machine, at a known location and determining at least one of an expected pitch of the machine and an expected roll of the machine, at a known location. The method may further include comparing at least one of the actual pitch to the expected pitch of the machine and the actual roll to the expected roll of the machine. The method may also include outputting a signal indicative of the low tire pressure condition of at least one tire, if at least one of the actual pitch and the actual roll deviate from the expected pitch and the expected roll of the machine, respectively.

DETAILED DESCRIPTION

Figure 1:
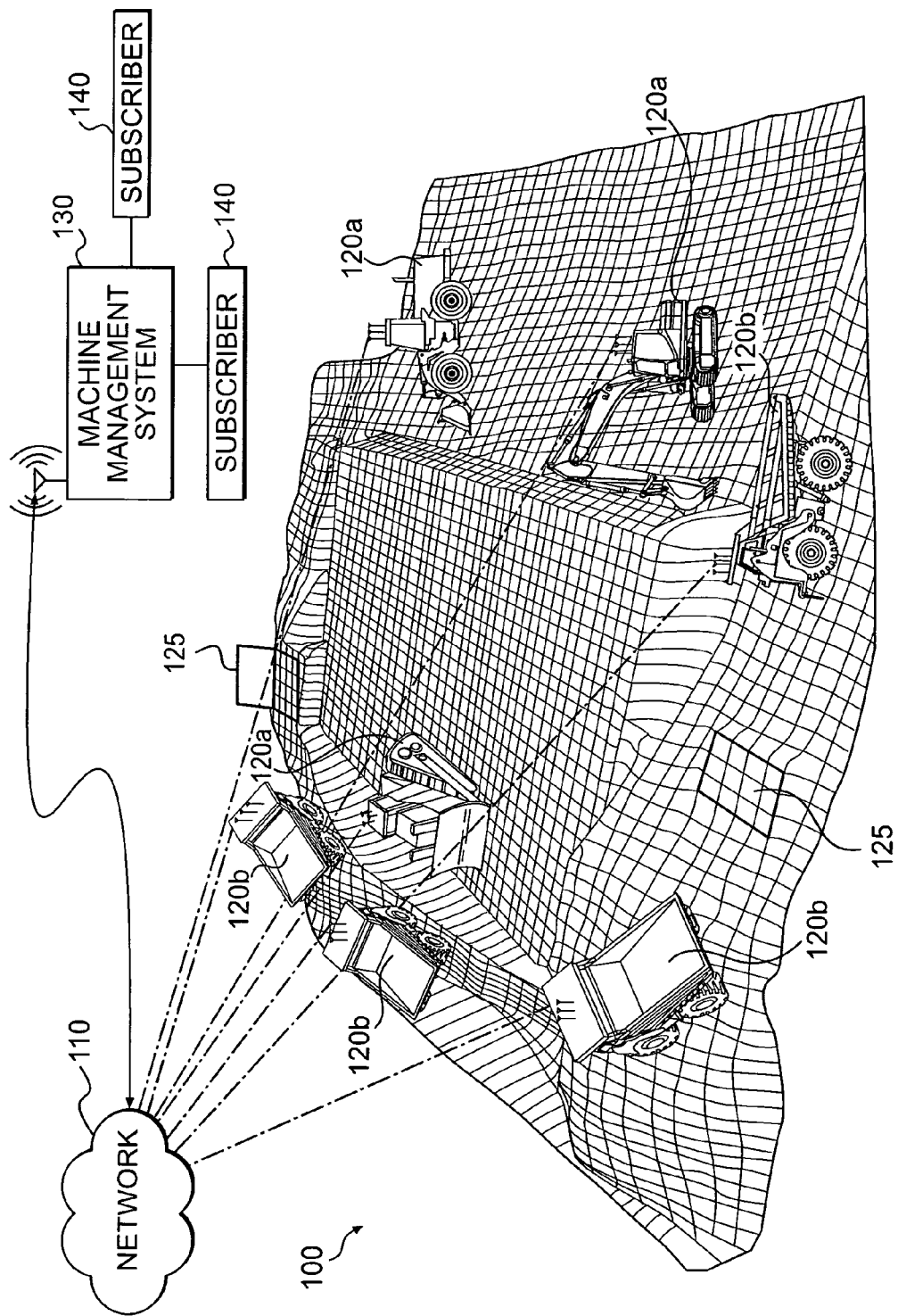
FIG. 1 illustrates an exemplary work environment consistent with the disclosed embodiments.

FIG. 1 illustrates an exemplary work environment 100 consistent with the disclosed embodiments. Work environment 100 may include systems and devices that cooperate to perform a commercial or industrial task, such as mining, construction, energy exploration and/or generation, manufacturing, transportation, agriculture, or any task associated with other types of industries. According to the exemplary embodiment illustrated in FIG. 1, work environment 100 may include a mining environment that comprises one or more machines 120a, 120b coupled to a machine management system 130 via a communication network 110. Work environment 100 may be configured to monitor, collect, and filter information associated with the status, health, and performance of one or more machines 120a, 120b, and distribute the information to one or more back-end systems or entities, such as machine management system 130 and/or subscribers 140. It is contemplated that work environment 100 may include additional and/or different components than those listed above.

As illustrated in FIG. 1, machines 120a, 120b may include one or more excavators 120a and one or more transport machines 120b. Excavators 120a may embody any machine that is configured to remove material from the mine and load the material onto one or more transport machines 120b. Non-limiting examples of excavators 120a include, for example, bucket-type excavating machines, electromagnetic-lift devices, backhoe loaders, dozers, etc. Transport machines 120b may embody any machine that is configured to transport materials within work environment 100 such as, for example, articulated trucks, dump trucks, or any other truck adapted to transport materials. The number, sizes, and types of machines illustrated in FIG. 1 are exemplary only and not intended to be limiting. Accordingly, it is contemplated that work environment 100 may include additional, fewer, and/or different machines than those listed above. For example, work environment 100 may include skid-steer loader(s), track-type tractor(s), material transfer vehicle(s), or any other suitable fixed or mobile machines that may contribute to the operation of work environment 100. The machines may communicate within or external to work environment 100 via network 110.

Communication network 110 may include any network that provides two-way communication between machines 120a, 120b and an off-board system, such as machine management system 130. For example, communication network 110 may communicatively couple machines 120a, 120b to machine management system 130 across a wireless networking platform such as, for example, a satellite communication system. Alternatively and/or additionally, communication network 110 may include one or more broadband communication platforms appropriate for communicatively coupling one or more machines 120a, 120b to machine management system 130 such as, for example, cellular, Bluetooth, microwave, point-to-point wireless, point-to-multipoint wireless, multipoint-to-multipoint wireless, or any other appropriate communication platform for networking a number of components. Although communication network 110 is illustrated as a wireless communication network, it is contemplated that communication network 110 may include wireline networks such as, for example, Ethernet, fiber optic, waveguide, or any other type of wired communication network.

Work environment 100 may include one or more known areas or known locations 125 that may have been carefully surveyed to map the associated topology. Accordingly, terrain characteristics such as grade may be determined and recorded for these known locations 125. Based on the topological information, the expected pitch and/or expected roll of one or more machines 120a, 120b may be determined for each known location 125. The expected pitch and/or expected roll may be the pitch and/or roll of machines 120a, 120b expected at a known location 125, based on the particular information about machines 120a, 120b such as loading capacity. For example, different expected pitch and/or expected roll values may be calculated for each machine at different payload weights and characteristics associated with the machine, as a fully loaded machine may have a different expected pitch and/or expected roll than a machine that is completely unloaded. Pitch is a measure of the rotation of the machine along the drive axis. Roll is a measure of the left or right rotation of the machine.

Known locations 125 may include one or more suitable locations within work environment 100 where terrain characteristics have been surveyed and documented, thereby providing a reference for determining expected characteristics of machine operation (e.g., pitch and/or roll). According to one embodiment, known location 125 may include a common area that is traversed by many of the machines in work environment 100. For example, known location 125 may include a designated area where machines 120a, 120b are switched between autonomous mode and operator controlled mode. When machines 120a, 120b are being switched between autonomous mode and operator controlled mode, the condition and/or pressure of the tires associated with machines 120a, 120b may be inspected. A change in tire pressure may cause a change in one or more of the pitch and/or roll of machines 120a, 120b.

Machine management system 130 may improve performance of machines 120a, 120b in work environment 100 by monitoring, analyzing, and/or controlling performance or operation of one or more individual machines. Additionally, machine management system 130 may store one or more parameters associated with machines 120a, 120b. Machine management system 130 may provide a central location for monitoring and/or controlling the performance of multiple machines 120a, 120b.

Subscribers 140 may be one or more entities with an interest or stake in the performance or health of machines 120a, 120b, and may have duties or responsibilities to maintain the performance of or health of machines 120a, 120b. Subscribers 140 may receive information, such as a low tire pressure on one or more machines 120a, 120b. Subscribers 140 may receive the information from machine management system 130. Subscribers 140 may include, for example, operators of one or more transport machines 120b, operators of one or more machines (e.g., automatic loading machines (conveyor belts, buckets, etc.), excavators 120a, etc.) responsible for loading transport machines 120b, project managers, mine owners, repair technicians, shift managers, human resource personnel, or any other person or entity that may be designated.

Figure 2:
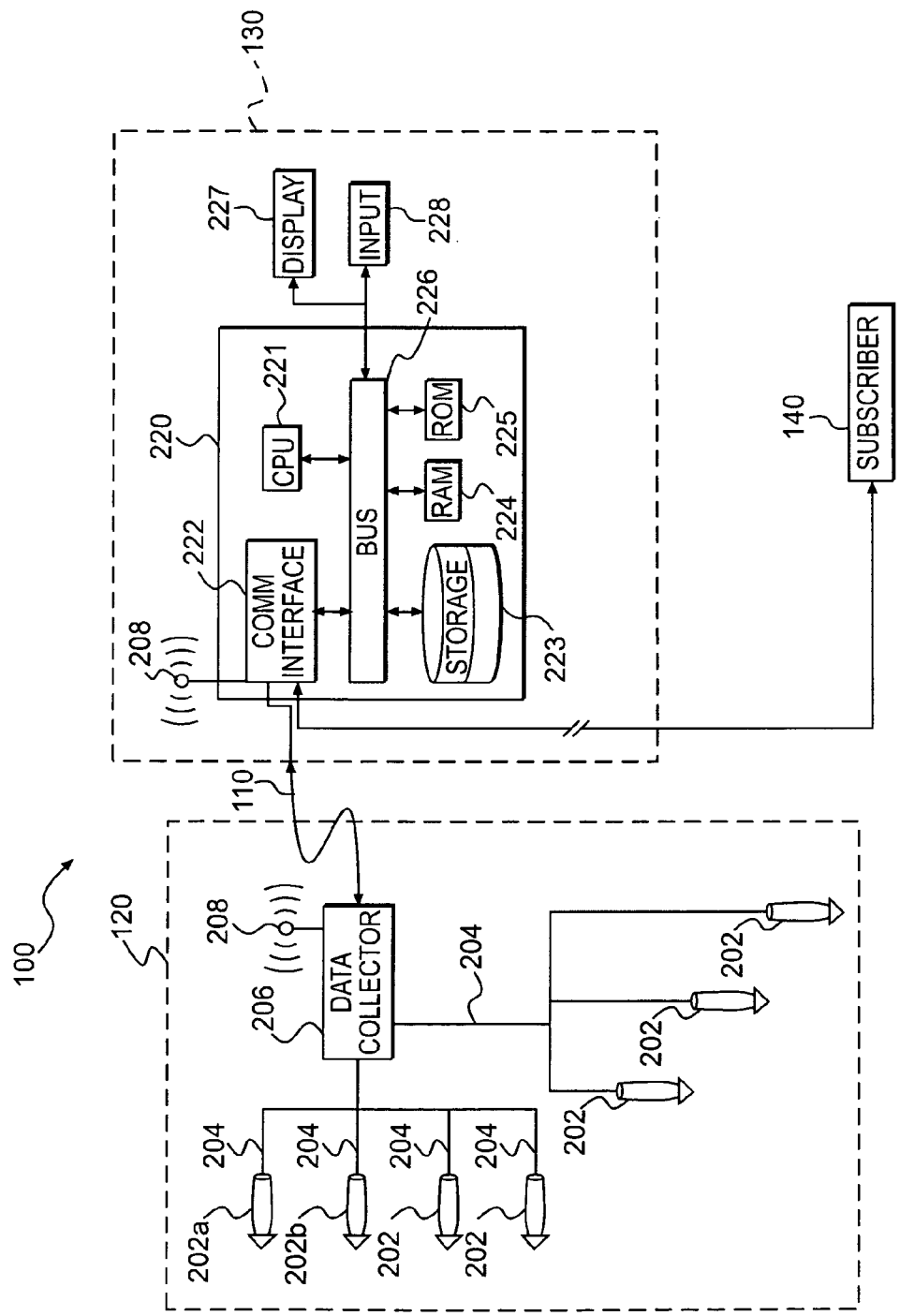
FIG. 2 provides a schematic diagram illustrating certain components associated with the work environment of FIG. 1.

In one embodiment, each of machines 120a, 120b may include on-board data collection and communication equipment to monitor, collect, and/or distribute information associated with one or more components of machines 120a, 120b. As shown in FIG. 2, machines 120a, 120b may each include, among other things, one or more sensors 202 and/or electronic control modules coupled to one or more data collectors 206 via communication lines 204; one or more transceiver devices 208; and/or any other components for monitoring, collecting, and communicating information associated with the operation of machines 120a, 120b. Each of machines 120a, 120b may also be configured to receive information, warning signals, operator instructions, or other messages or commands from off-board systems, such as a machine management system 130. The components described above are exemplary and not intended to be limiting. Accordingly, the disclosed embodiments contemplate each of machines 120a, 120b including additional and/or different components than those listed above.

Sensors 202 may include any device for collecting performance data associated with one or more machines 120a, 120b. For example, sensors 202 may include one or more sensors for measuring an operational parameter such as engine and/or machine speed and/or location; fluid pressure, flow rate, temperature, contamination level, and or viscosity of a fluid; electric current and/or voltage levels; fluid (i.e., fuel, oil, etc.) consumption rates; loading levels (i.e., payload value, percent of maximum payload limit, payload history, payload distribution, etc.); transmission output ratio, slip, etc.; grade; traction data; drive axle torque; intervals between scheduled or performed maintenance and/or repair operations; and any other operational parameter of machines 120a, 120b.

In one embodiment, machines 120a, 120b may each include at least one of a pitch sensor 202a and/or a roll sensor 202b for monitoring the actual pitch and/or actual roll of machines 120a, 120b. Alternatively, pitch sensor 202a and/or roll sensor 202b may be configured to monitor a parameter from which the pitch and/or roll of machines 120a, 120b may be calculated or derived.

It is contemplated that one or more sensors 202 may be configured to monitor certain environmental features associated with work environment 100. For example, one or more machines 120a, 120b may include an inclinometer for measuring an actual grade associated with a surface upon which the machine is traveling. An inclinometer may be used to determine if the actual grade of a known location 125 matches the expected grade of known location 125, to verify the orientation of the machine, and to verify that known location 125 remains unchanged.

Data collector 206 may be configured to receive, collect, package, and/or distribute performance data collected by sensors 202. Performance data, as the term is used herein, refers to any type of data indicative of at least one operational aspect associated with one or more machines 120a, 120b, or any of its constituent components or subsystems. Non-limiting examples of performance data may include, for example, health information such as fuel level, oil pressure, engine temperature, coolant flow rate, coolant temperature, or any other data indicative of the health of one or more components or subsystems of machines 120a, 120b. Alternatively and/or additionally, performance data may include status information such as engine power status (e.g., engine running, idle, off), engine hours, engine speed, machine speed, machine location, current gear that the machine is operating in, or any other data indicative of a status of machines 120a, 120b. Optionally, performance data may also include certain productivity information such as task progress information, load vs. capacity ratio, shift duration, haul statistics (weight, payload, etc.), fuel efficiency, or any other data indicative of a productivity of machines 120a, 120b. Alternatively and/or additionally, performance data may include control signals for controlling one or more aspects or components of machines 120a, 120b. According to one embodiment, performance data may include payload information, which may be used to determine the expected pitch and/or expected roll of the machine at a known location 125.

Data collector 206 may receive performance data from one or more sensors 202 via communication lines 204 during operation of the machine and may transmit the received data to machine management system 130 via communication network 110. Alternatively or additionally, data collector 206 may store the received data in memory for a predetermined time period, for later transmission to machine management system 130. For example, if a communication channel between the machine and machine management system 130 becomes temporarily unavailable, the performance data may be stored in memory for subsequent retrieval and transmission when the communication channel has been restored.

Machine management system 130 may include one or more hardware components and/or software applications that cooperate to improve performance of machines 120a, 120b in work environment 100 by monitoring, analyzing, and/or controlling performance or operation of one or more individual machines. For example, machine route management system 130 may include a condition monitoring system 220 for collecting, distributing, analyzing, and/or otherwise managing performance data collected from machines 120a, 120b. In one exemplary embodiment, condition monitoring system 220 may determine an actual pitch and/or an actual roll associated with a machine, determine an actual position of machines 120a, 120b on a haul road or other surface, calculate a grade of the haul road or other surface, and/or determine the expected pitch and/or expected roll of the machine at that position of the machine on the haul road or other surface. The tire pressure condition may be determined by comparing actual pitch and/or an actual roll associated with a machine and the expected pitch and/or expected roll of the machine at a known location 125.

Condition monitoring system 220 may include any computing system configured to receive, analyze, transmit, and/or distribute performance data associated with machines 120a, 120b. Condition monitoring system 220 may be communicatively coupled to one or more machines 120a, 120b via communication network 110. In an alternate embodiment, condition monitoring system 220 may be located on machines 120a, 120b. Condition monitoring system 220 may embody a centralized server and/or database adapted to collect and disseminate performance data associated with each of machines 120a, 120b.

Condition monitoring system 220 may include hardware and/or software components that perform processes consistent with certain disclosed embodiments. For example, as illustrated in FIG. 2, condition monitoring system 220 may include one or more transceiver devices 208; a central processing unit (CPU) 221; a communication interface 222; one or more computer-readable memory devices such as storage device 223, a random access memory (RAM) 224, and a read-only memory (ROM) 225; a common information bus 226; a display unit 227; and/or an input device 228. The components described above are exemplary and not intended to be limiting. Furthermore, it is contemplated that condition monitoring system 220 may include alternative and/or additional components than those listed above.

CPU 221 may be one or more processors that execute instructions and process data to perform one or more processes consistent with certain disclosed embodiments. For instance, CPU 221 may execute software that enables condition monitoring system 220 to request and/or receive performance data from data collector 206 of machines 120a, 120b. CPU 221 may also execute software that stores collected performance data in storage device 223. In addition, CPU 221 may execute software that enables condition monitoring system 220 to analyze performance data collected from one or more machines 120a, 120b, perform diagnostic and/or prognostic analysis to identify potential problems with the machine, notify a machine operator or subscriber 140 of any potential problems, and/or provide customized operation analysis reports, including trending data on collected performance data.

CPU 221 may be connected to a common information bus 226 that may be configured to provide a communication medium between one or more components associated with condition monitoring system 220. For example, common information bus 226 may include one or more components for communicating information to a plurality of devices. According to one embodiment, CPU 221 may access, using common information bus 226, computer program instructions stored in memory. CPU 221 may then execute sequences of computer program instructions stored in computer-readable medium devices such as, for example, a storage device 223, RAM 224, and/or ROM 225 to perform methods consistent with certain disclosed embodiments, as will be described below.

Communication interface 222 may include one or more elements configured for two-way data communication between condition monitoring system 220 and remote systems (e.g., machines 120a, 120b) via transceiver device 208. For example, communication interface 222 may include one or more modulators, demodulators, multiplexers, demultiplexers, network communication devices, wireless devices, antennas, modems, or any other devices configured to support a two-way communication interface between condition monitoring system 220 and remote systems or components.

One or more computer-readable medium devices may include storage device 223, a RAM 224, ROM 225, and/or any other magnetic, electronic, flash, or optical data computer-readable medium devices configured to store information, instructions, and/or program code used by CPU 221 of condition monitoring system 220. Storage devices 223 may include magnetic hard-drives, optical disc drives, floppy drives, flash drives, or any other such information storing device. RAM 224 may include any dynamic storage device for storing information and instructions by CPU 221. RAM 224 also may be used for storing temporary variables or other intermediate information during execution of instructions to be executed by CPU 221. During operation, some or all portions of an operating system (not shown) may be loaded into RAM 224. In addition, ROM 225 may include any static storage device for storing information and instructions by CPU 221.

Condition monitoring system 220 may be configured to analyze performance data associated with each of machines 120a, 120b. According to one embodiment, condition monitoring system 220 may include diagnostic software for analyzing performance data associated with one or more machines 120a, 120b based on threshold levels (which may be factory set, manufacturer recommended, and/or user configured) associated with a respective machine. For example, diagnostic software associated with condition monitoring system 220 may compare an engine temperature measurement received from a particular machine with a predetermined threshold engine temperature for that machine. If the measured engine temperature exceeds the threshold temperature, condition monitoring system 220 may generate an alarm and notify one or more of the machine operator, job-site manager, repair technician, dispatcher, or any other appropriate entity.

Condition monitoring system 220 may include a hardware or software module configured to receive/collect certain performance data from sensors 202, 202a, and 202b. Condition monitoring system 220 may determine, based on the received performance data, an actual pitch and/or actual roll associated with one or more machines 120a, 120b.

Condition monitoring system 220 may determine a grade for the one or more machines. The grade may be determined based on monitored GPS data associated with the machine, or other positioning systems, such as an internal machine system. For example, the grade may be determined using the latitude, longitude, and elevation of the machine derived from GPS data gathered from on-board GPS equipment. Four or more remote positioning devices (or GPS satellites) may be used to determine elevation and grade of the machine. According to one embodiment, the grade may be determined by calculating ratio between the vertical change in position (based on the elevation data associated with the GPS data) and the horizontal change in position (based on the latitude and longitude data associated with the GPS data). Alternatively or additionally, actual grade may be determined using an on-board data monitoring device such as, for example, an inclinometer.

Condition monitoring system 220 may also be configured to simulate models corresponding with one or more machines under a variety of haul road conditions. For example, using a software model associated with a machine 120b, condition monitoring system 220 may determine an expected pitch and/or expected roll corresponding to each grade value presented to machine 120b. Alternatively, condition monitoring system 220 may load from a table in storage device 223, an expected pitch and/or expected roll corresponding to each grade value presented to machine 120b. The expected pitch and/or expected roll may be expressed as a number, a range of values around a number, a range of values between two numbers, a range of values, or a minimum or maximum value. The range of values may be a predetermined amount or percentage of the number, or may be determined at the time the expected pitch and/or expected roll is determined.

Figure 3:
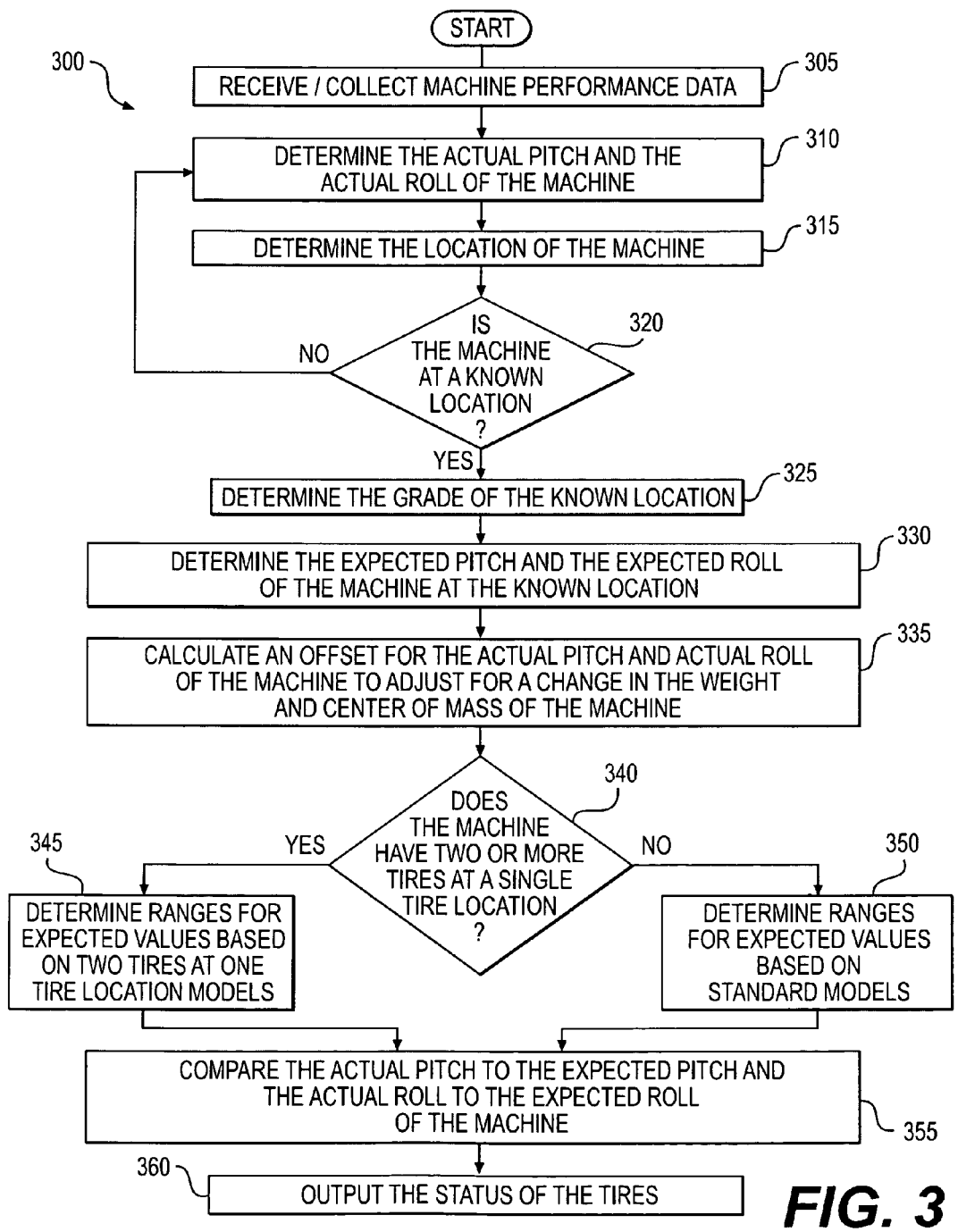
FIG. 3 provides a flowchart depicting an exemplary method for detecting a low tire pressure condition, consistent with the disclosed embodiments.

Processes and methods consistent with the disclosed embodiments may enable the detection of a low tire pressure condition based on the performance of one or more machines 120a, 120b operating in work environment 100 by providing a system that combines real-time data monitoring and collection capabilities with performance analysis and simulation tools. Specifically, the features and methods described herein allow project managers, equipment owners, and/or mine operators to effectively identify changes in actual pitch and/or actual roll in relation to a known reference surface. Such changes in actual pitch and/or actual roll may indicate that one or more of the tires of the machine have experienced a change in tire pressure, and the machine may not be sitting the same as previously. A low tire pressure may cause the machine to sit differently. In other words, the machine may list in the direction of the low pressure or flat tire. The list of the machine may be reflected in a change in the actual pitch and/or actual roll of the machine. FIG. 3 provides a flowchart 300, which illustrates an exemplary method to detect a low tire pressure condition that may be performed by machine management system 130.

FIG. 3 illustrates a flowchart 300 depicting an exemplary method for detecting a low tire pressure condition based on comparing the actual pitch and/or actual roll of a machine with the expected pitch and/or expected roll of a machine at a known location 125. More specifically, deviations of actual (i.e., measured) pitch and actual roll of a machine from previous actual pitch and/or previous actual roll or expected pitch and/or expected roll data may indicate that the relative position of a portion of the machine differs from an expected position. This difference may be caused by a change in the terrain condition (possibly caused by degradation of the haul road) or a change in the machine conditions (possibly caused by a change in tire pressure of the machine). Accordingly, by ensuring that terrain conditions are properly maintained at known locations 125, detected deviations in pitch and roll data may be used to identify tire pressure problems associated with a machine.

As illustrated in FIG. 3, performance data may be collected from at least one machine operating on the haul route or other surface (Step 305). For example, condition monitoring system 220 of machine management system 130 may receive/collect performance data from each machine operating in work environment 100. According to one embodiment, condition monitoring system 220 may automatically receive this data from data collectors 206 associated with each of machines 120a, 120b. Alternatively or additionally, condition monitoring system 220 may provide a data request to each of machines 120a, 120b and receive performance data from each machine in response to the request.

Once machine performance data has been collected, the actual pitch and/or the actual roll of the machine may be determined, based on the machine performance data (Step 310). According to one embodiment, condition monitoring system 220 may determine the actual pitch and/or the actual roll of the machine. For example, condition monitoring system 220 may determine the actual pitch from data collected from pitch sensor 202a. Similarly, condition monitoring system 220 may determine the actual roll from data collected from roll sensor 202b. It is contemplated that condition monitoring system 220 may be configured to determine actual pitch and/or actual roll for each machine in real-time, as condition monitoring system 220 collects performance data during operations of each of machines 120a, 120b.

The location of the machine may be determined (Step 315). According to one embodiment, GPS or another positioning system, alone or in combination with an internal tracking system of the machine, may track or periodically update the position of the machine. In another exemplary embodiment, RFID tags located on-board the machine may be detected by RFID receivers distributed throughout work environment 100 to determine positions of machines 120a, 120b in work environment 100. In another exemplary embodiment, a combination of GPS and RFID methodologies may be employed to determine the location of machines 120a, 120b in work environment 100.

Once the location of the machine has been determined, the location of the machine may be compared with a listing of known locations to determine if the machine is at a known location 125 (Step 320). According to one embodiment, a known location 125 may be any location that has been surveyed, or is regularly surveyed. Because known location 125 has been surveyed, the grade of the location is known and/or the expected pitch and/or the expected roll are known. One characteristic of a known location 125 is an ability to provide a stable baseline to generate an expected pitch and/or an expected roll to compare against the actual pitch and/or the actual roll. If the machine is not at a known location 125, the process will next execute Step 310. If the machine is at a known location 125, the process may next execute Step 325.

The grade of the known location 125 may be determined (Step 325). According to one embodiment, the GPS or another positioning system, alone or in combination with an internal tracking system of the machine, and/or RFID tags may be used to determine the grade of the location of the machine. The grade at this location may be compared to the grade of known location 125. Comparing the grade of the location of the machine to the grade of known location 125 may be useful as a check that the machine is at known location 125. In one exemplary embodiment, if the grade of the machine and the expected grade of known location 125 are the same, and the machine has a known tire size, an expected tire pressure, and a known loading, the machine may have an expected pitch and/or expected roll at known location 125.

Once machine location and the grade of the known location 125 are determined, the expected pitch and/or the expected roll of the machine at the known location 125 may be determined (Step 330). According to one embodiment, after machine location and the grade of the known location 125 are determined, condition monitoring system 220 may determine the expected pitch and/or the expected roll of the machine. The expected pitch and/or expected roll may be expressed as a number, a range of values around a number, a range of values between two numbers, a range of values, or a minimum or maximum value. The range component of the expected pitch and/or expected roll is usually determined during or after Step 345 or 350, when the number of tires per tire location is determined. The range of values may be a predetermined amount or percentage of the number, or may be determined at the time the expected pitch and/or expected roll is determined.

For example, condition monitoring system 220 may determine the expected pitch and/or the expected roll from one or more of the grade of the known location 125, the heading and orientation of the machine, the tire size, the tire configuration, the estimated tire pressure (of properly inflated tires), the unloaded weight, and the velocity and acceleration of the machine. In another example, condition monitoring system 220 may load the expected pitch and/or the expected roll of the machine from a table in storage device 223, based on one or more of the grade of the known location 125, the heading and orientation of the machine, the tire size, the tire configuration, the estimated tire pressure, the unloaded weight, and the velocity and acceleration of the machine.

In another embodiment, condition monitoring system 220 may also use a loaded weight and/or a center of mass of the machine to calculate the expected pitch and/or the expected roll. In a standard configuration, the center of mass of the machine may be known, but if the position of the work tool or the distribution of the load are not standard, the center of mass of the machine may change. A change in the center of mass of the machine may change the distribution of weight on each wheel, which may change the expected pitch and/or expected roll of the machine. The weight and/or a center of mass of the machine may be based on data collected from the machine, estimates based on the use of the machine, or historical data. For example, the center of mass may be based on one or more of the machine configuration, the position of a work tool of the machine, actual or estimated data on size and distribution of load, and any other data available.

In another embodiment, condition monitoring system 220 may set the expected pitch and/or the expected roll equal to a previous actual pitch and/or a previous actual roll determined at the known location 125. The same machine, at the same known location 125, similarly loaded, may be expected to have the same pitch and/or roll, each time the machine is at the same known location 125. This may be applicable in a repetitive route, where the loading and configuration of a machine may be relatively stable. It may also be applicable in cases where trends in the roll and/or pitch data may be monitored to detect a low tire pressure condition based on gradual changes in actual roll and/or actual pitch data.

The previous actual pitch and/or the previous actual roll may be determined in several ways. In one embodiment, the previous actual pitch and/or the previous actual roll may be determined from calibrating the machine at the known location 125, for example, at the start of the work week. In another embodiment, the previous actual pitch and/or the previous actual roll may be determined from the last actual pitch and/or actual roll determined at known location 125. The last actual pitch and/or actual roll determined at the known location 125 may be used for the same or similar machines. It is contemplated that condition monitoring system 220 may be configured to determine the expected pitch and/or the expected roll for each machine in real-time, as condition monitoring system 220 collects performance data during operations of each of machines 120*a*, 120*b*.

Once the expected pitch and/or the expected roll are determined, an offset may be calculated to adjust the actual pitch and/or the actual roll of the machine to account for a change in the weight and center of mass of the machine (Step 335). For example, depending upon the payload weight of the machine and the location of distribution of the payload, the weight and/or center of mass of a machine may change during its normal use in work environment 100. As a result, when the actual pitch and/or the actual roll are compared with the expected pitch and/or the expected roll at a known location 125, the differences in the pitch and/or the roll caused by a change in the weight and/or center of mass of a machine may be accounted for. In one embodiment, the offsets to adjust for a change in the weight and/or center of mass of the machine may be calculated and applied to the actual pitch and/or the actual roll of the machine. In another embodiment, the offsets may be calculated and applied to the expected pitch and/or the expected roll at a known location 125. In yet another embodiment, the offsets may be calculated as part of Step 325 when the expected pitch and/or the expected roll at a known location 125 were determined.

Once the offsets have been calculated, the process may determine if the machine has two or more tires at a single tire location (Step 340). According to one embodiment, a single tire location is a left or right side of an axle. As an illustrative example, an automobile would have 4 tire locations, with one tire at each tire location. In some embodiments, machines 120*a*, 120*b* may have more than one tire at a tire location, that is, an inner and outer tire at a tire location. The behavior of the pitch and/or the roll of a machine as a function of the tire pressure of a tire may be different in the case of one tire at each tire location versus two or more tires at some tire locations. If the machine has more than one tire at some of its tire locations, the process may next execute Step 345. If the machine has one tire at each tire location, the process will next execute Step 350.

According to one embodiment, the expected pitch and/or the expected roll may require tighter ranges based on models of machines with more than one tire at one or more tire locations. A change in tire pressure on a tire at a tire location with more than one tire may have a smaller effect on the actual pitch and/or actual roll then a tire at a tire location with only one tire. The one or more other tires at that tire location may carry some of the burden the tire whose pressure has dropped was carrying, making a change in pitch and/or roll, and consequently, a change in tire pressure, harder to detect.

If the machine has more than one tire at a single tire location, the ranges of values for the expected pitch and/or the expected roll based on two tires at one tire location may be determined (Step 345). Even if the tire pressure and the machine are unchanged, the expected pitch and/or the expected roll and the actual pitch and/or the actual roll may not be an exact match. The expected pitch and/or the expected roll and the actual pitch and/or the actual roll may not be an exact match due to unevenness in the load distribution, errors in the grade or orientation, or the inaccuracy of applying the expected pitch and/or expected roll for a class of machines to individual machines. Therefore, the expected pitch and/or the expected roll may be expressed as a range of values around a number, a range of values between two numbers, a range of values, or a minimum or maximum value. The expected pitch and/or the expected roll, including a range component, may be used to compare the actual and expected values.

The expected ranges of values for the expected pitch and/or the expected roll based on one tire at each tire location may be determined (Step 350). Similar to Step 345, the expected pitch and/or the expected roll and the actual pitch and/or the actual roll may not be an exact match. Therefore, the expected pitch and/or the expected roll may be expressed as a range of values around a number, a range of values between two numbers, a range of values, or a minimum or maximum value. The expected pitch and/or the expected roll, including a range component, may be used to compare the actual and expected values. According to one embodiment, the expected pitch and/or the expected roll may have ranges calculated based on models of the machine based on one tire at each tire location.

In certain situations, a threshold or "buffer" range may be established in connection with the expected pitch and/or the expected roll. This may be done in either the two tires at one tire location range determination of Step 345 or the one tire at each tire location range determination of Step 350. This may be particularly advantageous to prevent small and/or temporary deviations in determining the grade of machine 120*a* or 120*b* and/or center of mass (due to operator error, etc.) from creating an alarm condition. The threshold range may be established by the user as a permissible range by which the actual pitch and/or the actual roll may deviate from the expected pitch and/or the expected roll.

Once the expected pitch and/or the expected roll, including any range component, have been calculated, the actual pitch and/or the actual roll of the machine may be compared with the expected pitch and/or the expected roll at a known location 125 (Step 355). For example, the actual pitch of the machine may be compared to the expected pitch. If the actual pitch deviates from the expected pitch, the actual pitch is out of tolerance. Likewise, the actual roll of the machine may be compared to the expected roll. If the actual roll deviates from the range, the actual roll is out of tolerance. "Deviate from" can mean different from the expected number, different from the expected number by a predetermined amount or percentage, outside a range of values, below a minimum value or above a maximum value. In some further exemplary embodiments, the differences between the actual pitch and the expected pitch may be recorded, and the difference between the actual roll and the expected roll may be recorded.

In another embodiment, the actual pitch and/or the actual roll may be compared to previous actual pitches and/or actual rolls to detect a change in tire condition over time. In some exemplary embodiments, the comparison may be for previous actual pitches and/or previous actual rolls at the same known location 125. In other exemplary embodiments, the previous actual pitches and/or the previous actual rolls may be adjusted with an offset to account for a change in known location 125, or a change in the weight and/or center of mass of the machine.

In a still further set of exemplary embodiments, when the machine is unloaded, the actual pitch and/or the actual roll may be compared to previous actual pitches and/or the actual rolls when the machine was previously unloaded. When the machine is loaded, the actual pitch and/or the actual roll may be compared to previous actual pitches and/or the actual rolls when the machine was previously loaded. In a still further embodiment, an offset may be applied to previously loaded actual pitches and/or the actual rolls to account for a change in the weight and/or center of mass of the machine.

Condition monitoring system 220 may be configured to generate a status or alert about the tires and provide the status or alert to machine management system 130 and/or one or more subscribers 140 (Step 360). A status or alert may indicate the comparison of Step 355 was out of tolerance, or may be information, such as, for example, all tires appear normal. A status or alert may embody any type of signal or message notifying machine management system 130 and/or one or more subscribers 140 of the condition of the tires associated with one or more machines 120a, 120b. For example, condition monitoring system 220 may output tire condition data on a display console associated with the machine and any other machine that may be responsible for loading the machine. Alternatively or additionally, condition monitoring system 220 may provide an electronic message (e.g., electronic page, text message, fax, e-mail, etc.) indicative of the tire status or alert to a respective machine operator and/or a project manager, haul road dispatcher, excavator and/or loader operator, or any other person or entity established as a subscriber 140. In response to the tire status notification, subscribers 140 may take appropriate responsive action to investigate the condition of each tire to ensure that each tire is properly inflated and in good working condition.

While certain aspects and features associated with the method described above may be described as being performed by one or more particular components of machine management system 130, it is contemplated that these features may be performed by any suitable computing system. Also, while the method may describe condition monitoring system 220 as being part of machine management system 130, condition monitoring system 220 may be located on-board machines 120a, 120b. Furthermore, it is also contemplated that the order of steps in FIG. 3 is exemplary only and that certain steps may be performed before, after, or substantially simultaneously with other steps illustrated in FIG. 3.

INDUSTRIAL APPLICABILITY

Methods and systems consistent with the disclosed embodiments may provide a solution for detecting a low tire pressure conditions for autonomous machines operating in work environment 100. Machines 120a, 120b that employ processes and features described herein provide an automated system for detecting a low tire pressure by detecting the actual pitch and/or the actual roll of a machine at a known location 125 and comparing the actual pitch and/or the actual roll to an expected pitch and/or an expected roll at a known location 125 during real-time operations of the machine.

Although the disclosed embodiments are described in connection with work environments 100 involving haul routes for mining operations, they may be applicable to any work environment 100 where it may be advantageous to identify machines that have a low tire pressure. According to one embodiment, the presently disclosed system and associated methods for detecting a low tire pressure condition may be implemented as part of a connected worksite environment that monitors performance data associated with a machine fleet and diagnoses potential problems with machines in the fleet.

The presently disclosed system and method for detecting a low tire pressure condition may have several advantages. For example, the systems and methods described herein may detect a low tire pressure condition on a machine without requiring calculation of a precise, numerical tire pressure value, and without the cost of tire pressure sensors or additional sensors. For example, many autonomous machines include pitch and roll sensors and GPS systems for tracking and recording expected pitch and roll values of the work environment at various locations throughout work environment 100. Consequently, the systems and methods described herein may facilitate the detection of deviations in actual pitch and roll of the machine from the expected pitch and roll value, which may be indicative of tire pressure changes associated with the machine. As a result, the need for separate tire pressure sensor systems may be reduced and/or eliminated.

It will be apparent to those skilled in the art that various modifications and variations can be made to the disclosed system and method without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims.

What is claimed is:

1. A method of detecting a low tire pressure condition on a machine, comprising:
   determining at least one of an actual pitch of the machine and an actual roll of the machine, at a known location;
   determining at least one of an expected pitch of the machine at the known location and an expected roll of the machine at the known location, the at least one of the expected pitch and the expected roll varying based on the known location;
   comparing by a processor at least one of:
   the actual pitch to the expected pitch of the machine; and
   the actual roll to the expected roll of the machine;
   outputting a signal indicative of the low tire pressure condition of at least one tire, if at least one of the actual pitch and the actual roll deviate from the expected pitch and the expected roll of the machine, respectively.

2. The method of claim 1, wherein comparing at least one of the actual pitch to the expected pitch of the machine and the actual roll to the expected roll of the machine includes calculating an offset for at least one of the actual pitch and the actual roll of the machine, the offset adjusting for a change in a weight and a center of mass of the machine relative to the weight and the center of mass of the machine associated with the expected pitch and the expected roll.

3. The method of claim 1, further including determining if a tire location has two or more tires and adjusting the expected pitch and the expected roll to account for two or more tires at the tire location when comparing at least one of the actual pitch to the expected pitch of the machine and the actual roll to the expected roll of the machine.

4. The method of claim 1, wherein determining at least one of an expected pitch of the machine at the known location and an expected roll of the machine at the known location includes setting at least one of the expected pitch and the expected roll equal to a previous actual pitch and a previous actual roll.

5. The method of claim 1, wherein determining at least one of an expected pitch of the machine at the known location and an expected roll of the machine at the known location includes calculating at least one of the expected pitch and the expected roll from at least one of a grade of the known location, a weight and a center of mass of the machine, a tire size, and an estimated tire pressure of one or more tires of the machine.

6. The method of claim 1, further including comparing at least one of the actual pitch and the actual roll to previous actual pitches and previous actual rolls, respectively, to detect a change in tire status over time.

7. The method of claim 6, further including comparing at least one of the actual pitch and the actual roll to previous actual pitches and actual rolls, respectively, to detect a change in tire status over time, wherein if the machine is loaded, using previous actual pitches and previous actual rolls from when the machine was previously loaded, and if the machine is unloaded, using previous actual pitches and previous actual rolls from when the machine was previously unloaded.

8. A system for detecting a low tire pressure condition on a machine, comprising:
  a sensor for measuring an actual pitch and an actual roll of the machine;
  a position location system communicatively coupled to the sensor and configured to record a location of the machine corresponding to a location wherein the actual pitch and actual roll of the machine were measured; and
  a controller communicatively coupled to the sensor and the position location system, the controller configured to:
    receive information indicative of the actual pitch and the actual roll of the machine from the sensor;
    receive information indicative of the location of the machine from the position location system;
    determine whether at least one of the actual pitch and the actual roll deviate from an expected pitch and an expected roll of the machine, respectively, at the location of the machine corresponding to where the actual pitch and the actual roll of the machine were measured; and
    output a signal indicative of the low tire pressure condition of at least one tire if at least one of the actual pitch and the actual roll deviate from the expected pitch and the expected roll of the machine, respectively, at the location of the machine corresponding to where the actual pitch and the actual roll of the machine were measured.

9. The system of claim 8, wherein the controller configured to determine whether at least one of the actual pitch and the actual roll deviate from an expected pitch and an expected roll includes the controller calculating an offset for at least one of the actual pitch and the actual roll of the machine, the offset adjusting for a change in a weight and a center of mass of the machine compared to when the expected pitch and the expected roll were determined.

10. The system of claim 8, wherein the controller is further configured to determine if a tire location has two or more tires and adjusting the expected pitch and the expected roll to account for two or more tires at the tire location, when calculating whether at least one of the actual pitch and the actual roll deviate from an expected pitch and an expected roll, respectively, at the known location.

11. The system of claim 8, wherein an expected pitch and an expected roll of the machine at the known location is determined by the controller from a previous actual pitch and a previous actual roll.

12. The system of claim 8, wherein an expected pitch and an expected roll of the machine at the known location is determined by the controller from calculating at least one of the expected pitch and the expected roll from at least one of a grade of the known location, a weight and a center of mass of the machine, a tire size, and an estimated tire pressure of one or more tires of the machine.

13. The system of claim 8, wherein the controller is further configured to compare at least one of the actual pitch and the actual roll to previous actual pitches and previous actual rolls, respectively, to detect a change in tire status over time, wherein if the machine is loaded, using previous actual pitches and previous actual rolls from when the machine was previously loaded, and if the machine is unloaded, using previous actual pitches and previous actual rolls from when the machine was previously unloaded.

14. A non-transitory computer-readable medium for use on a computer system, the computer-readable medium including computer-executable instructions for performing, when executed by a processor, a method for detecting a low tire pressure condition on a machine, the method comprising:
  determining at least one of an actual pitch of the machine and an actual roll of the machine, at a known location;
  determining at least one of an expected pitch of the machine at the known location and an expected roll of the machine at the known location, the at least one of the expected pitch and the expected roll varying based on the known location;
  comparing at least one of:
  the actual pitch to the expected pitch of the machine; and
  the actual roll to the expected roll of the machine;
    outputting a signal indicative of the low tire pressure condition of at least one tire, if at least one of the actual pitch and the actual roll deviate from the expected pitch and the expected roll of the machine, respectively.

15. The computer-readable medium of claim 14, wherein comparing at least one of the actual pitch to the expected pitch of the machine and the actual roll to the expected roll of the machine includes calculating an offset for at least one of the actual pitch and the actual roll of the machine, the offset adjusting for a change in a weight and a center of mass of the machine compared to when the expected pitch and the expected roll were determined.

16. The computer-readable medium of claim 14, further including determining if a tire location has two or more tires and adjusting the expected pitch and the expected roll to account for two or more tires at the tire location when comparing at least one of the actual pitch to the expected pitch of the machine and the actual roll to the expected roll of the machine.

17. The computer-readable medium of claim 14, wherein determining at least one of an expected pitch of the machine at the known location and an expected roll of the machine at the known location includes setting at least one of the expected pitch and the expected roll equal to a previous actual pitch and a previous actual roll.

18. The computer-readable medium of claim 14, wherein determining at least one of an expected pitch of the machine at the known location and an expected roll of the machine at the known location includes calculating at least one of the expected pitch and the expected roll from at least one of a grade of the known location, a weight and a center of mass of the machine, a tire size, and an estimated tire pressure of one or more tires of the machine.

19. The computer-readable medium of claim 14, further including comparing at least one of the actual pitch and the actual roll to previous actual pitches and previous actual rolls, respectively, to detect a change in tire status over time.

20. The computer-readable medium of claim 19, further including comparing at least one of the actual pitch and the actual roll to previous actual pitches and previous actual rolls, respectively, to detect a change in tire status over time, wherein if the machine is loaded, using previous actual pitches and previous actual rolls from when the machine was previously loaded, and if the machine is unloaded, using previous actual pitches and previous actual rolls from when the machine was previously unloaded.

* * * * *